(12) United States Patent
Yamamoto

(10) Patent No.: US 7,261,174 B2
(45) Date of Patent: Aug. 28, 2007

(54) ALL-TERRAIN VEHICLE

(75) Inventor: Takao Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 343 days.

(21) Appl. No.: 10/776,786

(22) Filed: Feb. 11, 2004

(65) Prior Publication Data

US 2004/0216935 A1   Nov. 4, 2004

(30) Foreign Application Priority Data

Feb. 13, 2003   (JP) .............................. 2003-035226

(51) Int. Cl.
*B62D 39/00*   (2006.01)
(52) U.S. Cl. .................. 180/89.1; 180/908; 180/53.8; 439/34
(58) Field of Classification Search ............... 180/908, 180/89.1, 53.8; 439/34–36; 280/422, 479.1; 307/10.1, 9.1; 220/3.3, 3.2, 3.9
See application file for complete search history.

(56) References Cited

U.S. PATENT DOCUMENTS

| | | | | |
|---|---|---|---|---|
| 5,288,094 A | * | 2/1994 | Putnam | 280/420 |
| 5,718,301 A | * | 2/1998 | Williams | 180/65.1 |
| 6,076,691 A | * | 6/2000 | Belinky et al. | 220/3.9 |
| 6,447,302 B1 | * | 9/2002 | Davis | 439/34 |
| 2001/0047896 A1 | * | 12/2001 | Matsuura et al. | 180/69.24 |

FOREIGN PATENT DOCUMENTS

JP       2000-243129       9/2000

* cited by examiner

*Primary Examiner*—Ruth Ilan
(74) *Attorney, Agent, or Firm*—Hamre, Schumann, Mueller & Larson, PC

(57) ABSTRACT

An accessory socket is provided for easily supplying power to an accessory device of an all-terrain vehicle. A rear carrier is mounted to the rear portion of the vehicle, and a rear cowl is provided downwardly thereof. The rear cowl is provided with a pair of left and right rear combination lamps and an accessory socket for supplying power to accessory parts therebetween at the position adjacent to the rear combination lamp.

3 Claims, 4 Drawing Sheets

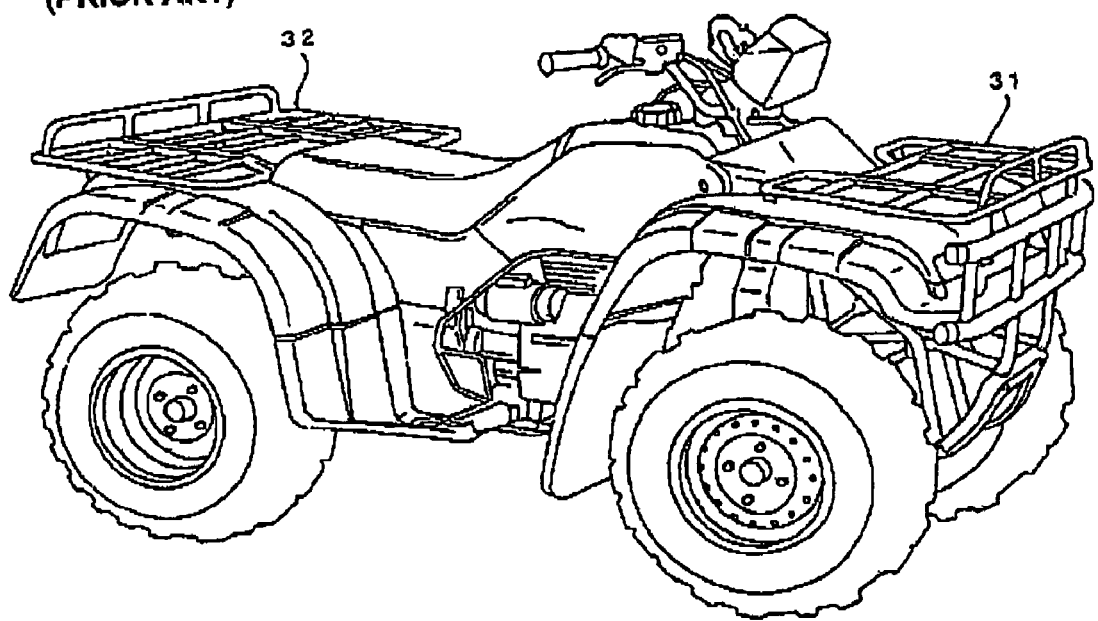

ALL-TERRAIN VEHICLE

FIELD OF THE INVENTION

The present invention relates to an all-terrain vehicle and, more specifically, an all-terrain vehicle provided with an accessory socket for providing a power to an electric accessory device such as a sprinkler, a sprayer, or a projector.

BACKGROUND OF THE INVENTION

An all-terrain vehicle which is adaptive to all types of terrain and is not only capable of traveling on roads in a well-maintained state such as paved roads, but also capable of traveling on agricultural land or mountainous land for the purpose of farm work, hunting, and the like, irrespective of weather is known. FIG. 6 is a perspective view of an all-terrain vehicle in the related art, disclosed in JP-A-2000-243129, in which a front carrier 31 is fixed to the front portion of the vehicle and a rear carrier 32 is fixed to the rear portion of the vehicle.

Various types of accessory devices are provided as options for the all-terrain vehicles described above, and may be used for various purposes not only as towing a trailer for transporting a large amount of loads but also as carrying a sprinkler on the rear carrier 32 for watering lawn or agricultural land, carrying a large projector on the front carrier 31 for functioning as a lighting vehicle, or carrying a water tank on the rear carrier 32 and connecting it with an electric portable sprayer.

When the accessory device such as the sprinkler or the projector is mounted on the vehicle, or when the operator operates the portable sprayer, the power is supplied from an accessory socket provided on the vehicle. In the all-terrain vehicle in the related art, the accessory socket is provided on an instrument panel or on a meter panel in front of a driver's seat as in family cars and the like.

In the related art describe above, a power cable does not reach the accessory socket in many cases where an attempt is made to supply power to the accessory device mounted on the carrier, or to the accessory device carried by the operator, such as the electric sprayer. In such cases, it is necessary to insert an extension cable into the accessory socket and supply the power to each accessory device via the extension cable.

It is an object of the present invention to solve the problem in the related art described above, and provide an all-terrain vehicle in which a power can easily be supplied to the electric accessory devices.

SUMMARY OF THE INVENTION

In order to achieve the object described above, the present invention provides an all-terrain vehicle including an accessory socket for supplying a power to an electric accessory device is characterized by following means.

A rear carrier is mounted on the rear portion of the vehicle and an accessory socket is provided forwardly of the rear end of the rear carrier and downwardly of the rear carrier. Since the accessory socket is provided forwardly of the rear end of the rear carrier and downwardly of the rear carrier, a power can easily be supplied from the vehicle to the accessory device mounted on the rear carrier, or to the accessory device used in the vicinity of the vehicle, without using the extension cable.

The accessory socket is provided on a rear cowl. Since the accessory socket is provided on the rear cowl, a power can easily be supplied from the vehicle not only to the accessory device mounted on the rear carrier, but also to the device towed by the trailer or to the accessory device mounted on the trailer.

The accessory socket is provided between a pair of left and right rear combination lamps provided on the rear portion of the vehicle. Since the accessory socket is provided between the pair of left and right rear combination lamps provided on the rear portion of the vehicle, splatter of mud, sand, or water by the rear wheel to the accessory socket can be minimized.

The accessory socket is provided so as not to project outwardly from an imaginary plane corresponding to the ground when the vehicle is stored in the upright position with the rear portion oriented downward. Considering that the vehicle is stored in the upright position, when providing the accessory socket on the bottom surface in the upright position, the accessory socket is prevented from being damaged by coming into contact with the ground when stored in the upright position even when the accessory socket is provided on the outer surface of the vehicle body.

The accessory socket is mounted to a stay suspending from a rear carrier. Since the accessory socket is mounted to the stay suspending from the rear carrier, the accessory socket can be mounted easily to the exterior of the vehicle without performing processing work on the vehicle body.

The accessory socket is provided with a protective cover. Since the accessory socket is provided with the protective cover, entering of mud, sand, water, and the like into the accessory socket can be prevented.

BRIEF DESCRIPTION OF THE DRAWINGS

FIG. 6 is a perspective view of an all-terrain vehicle in the related art.

DETAILED DESCRIPTION OF THE INVENTION

Figure 1:
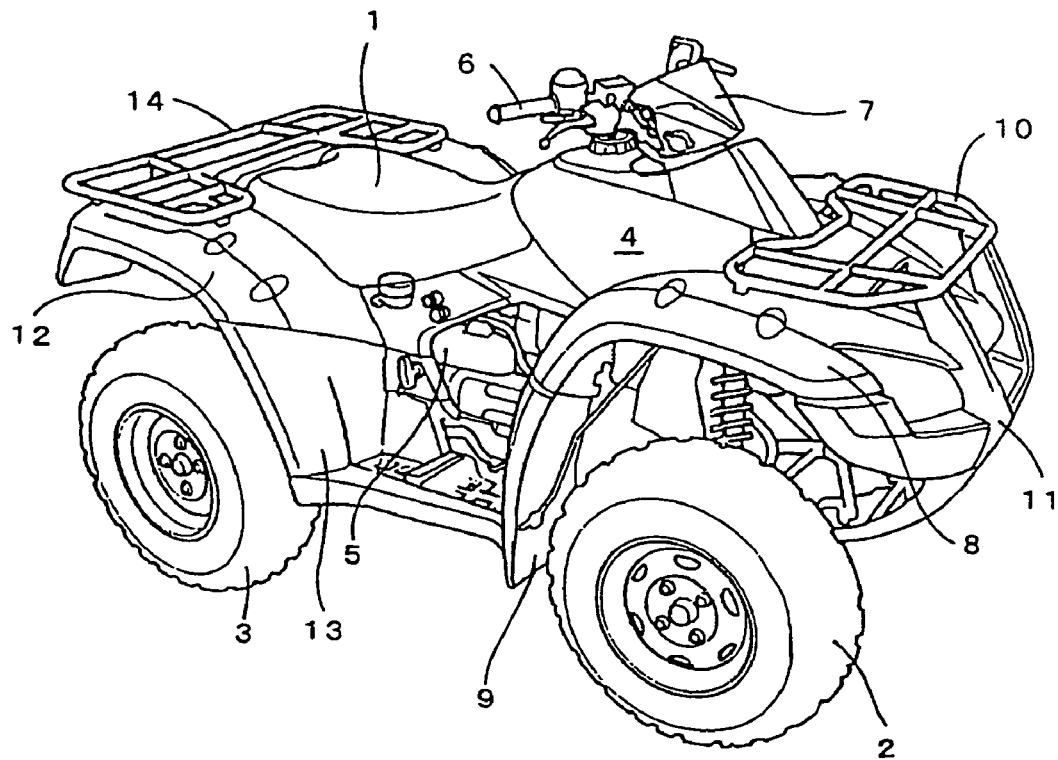
FIG. 1 is a perspective view of an all-terrain vehicle according to the present invention when viewed from the right front.
Figure 2:
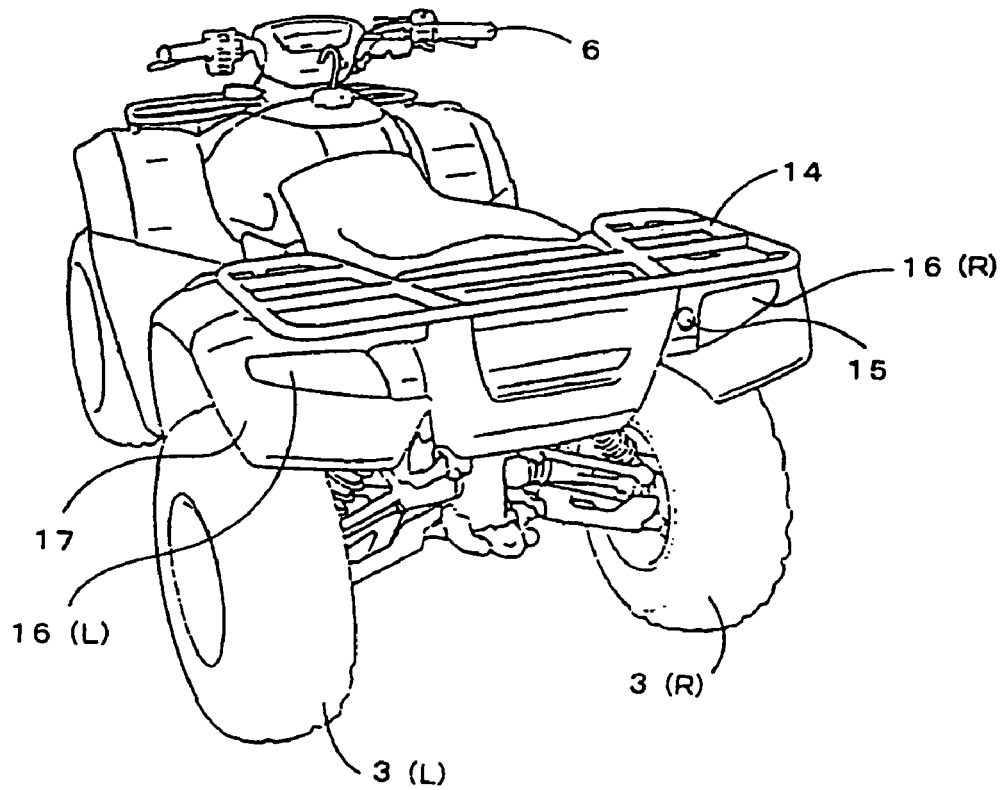
FIG. 2 is a perspective view of the same when viewed from the left rear.

Referring now to the drawings, a preferred embodiment of the present invention will be described in detail. FIG. 1 is a perspective view of an all-terrain vehicle according to the present invention when viewed from the right front, and FIG. 2 is a perspective view of the same when viewed from the left rear.

In FIG. 1, a driver's seat 1 is disposed between front wheels 2 and rear wheels 3 on which balloon tires are mounted, that is, at the center of the vehicle, and a fuel tank 4 is disposed forwardly of the seat 1. A drive system including an engine 5 is disposed downwardly of the fuel tank 4.

A handle 6 and an instrument box 7 being adjacent to the handle 6 are disposed forwardly of the fuel tank 4, and the portion of the vehicle forwardly of the handle 6 is covered by a front fender 8. A front mud guard 9 for preventing splatter of mud is disposed rearwardly of the front wheels 2.

A front carrier 10 for placing a load thereon is provided above the front fender 8, and a front grill 11 for protecting the front surface of a vehicle body is fixed at the front of the vehicle body. A rear fender 12 and a rear mud guard 13 extending forward therefrom are also provided on the side of the rear wheels 3.

As shown in FIG. 2, a rear carrier 14 is mounted on the rear portion of the vehicle, and a rear cowl 17 is provided downwardly thereof. The rear cowl 17 is provided with a pair of left and right rear combination lamps 16R, 16L, and an accessory socket 15 for supplying a power to accessory parts therebetween at the position adjacent to the rear combination lamp 16R.

In this manner, according to the present embodiment, since the accessory socket 15 is provided between the pair of left and right rear combination lamps, splatter of mud, sand, or water by the rear wheels 3 to the accessory socket 15 can be minimized. In addition, according to the present embodiment, since the accessory socket 15 is disposed forwardly of the rear end of the rear carrier 14 and downwardly of the rear carrier 14, a power can easily be supplied to an accessory device in a state in which the accessory device is mounted on the rear carrier 14.

Figure 3:
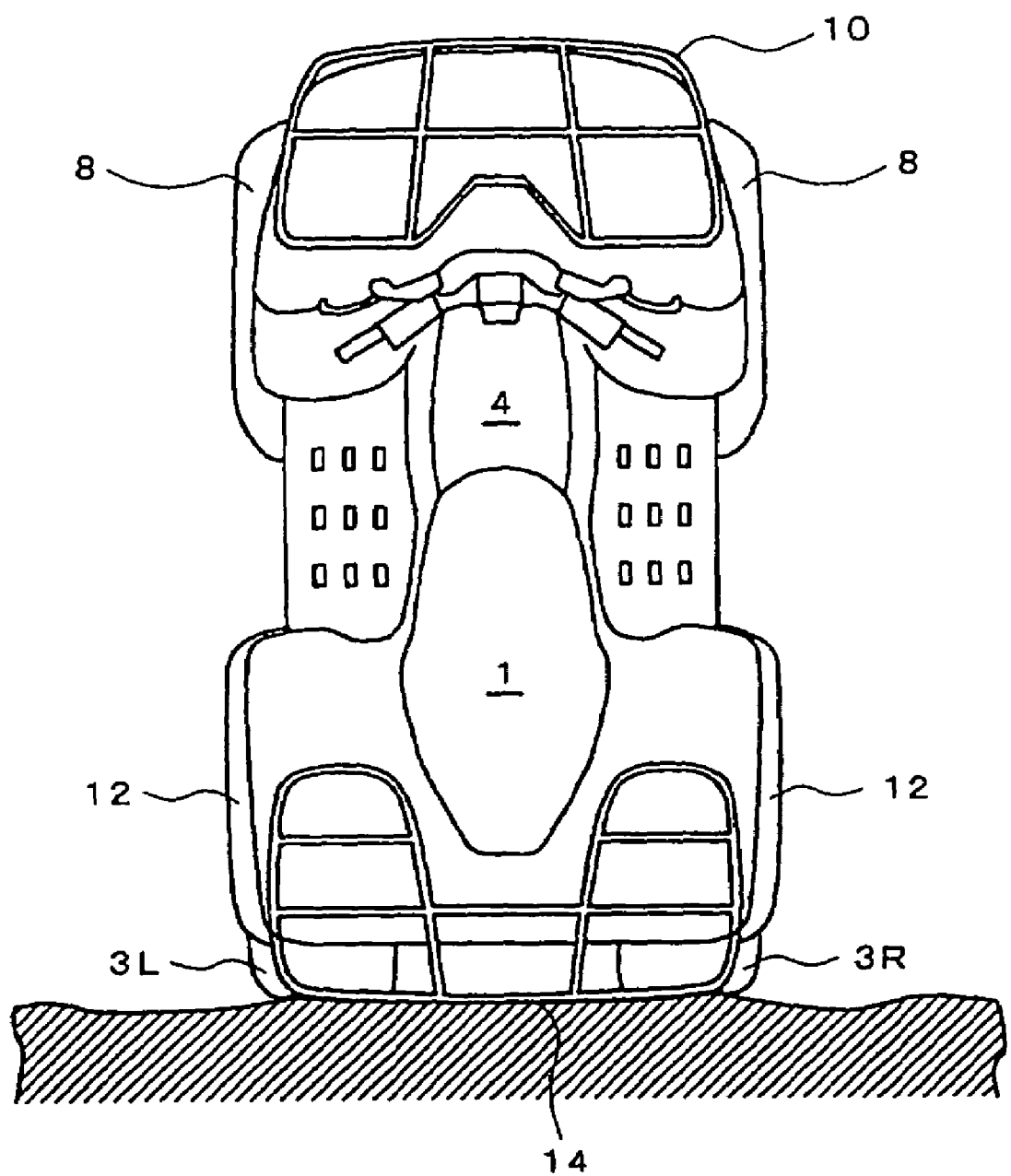
FIG. 3 is drawing showing how to store the all-terrain vehicle in the upright position.

The vehicle can be stored in the upright position with the rear portion of the vehicle oriented downward as shown in FIG. 3. When in the upright position, the vehicle is supported with the left and the right rear wheels 3L, 3R and the rear end of the rear carrier 14 are brought into contact with the ground. Therefore, the accessory socket 15 is disposed so as not to project from an imaginary plane (corresponding to the ground when in the upright position) including the grounded portion of the rear wheels 3L, 3R and the grounded portion of the rear carrier 14 toward the rear end of the vehicle to avoid contact with the ground even when the vehicle is stored in the upright position.

Figure 4:
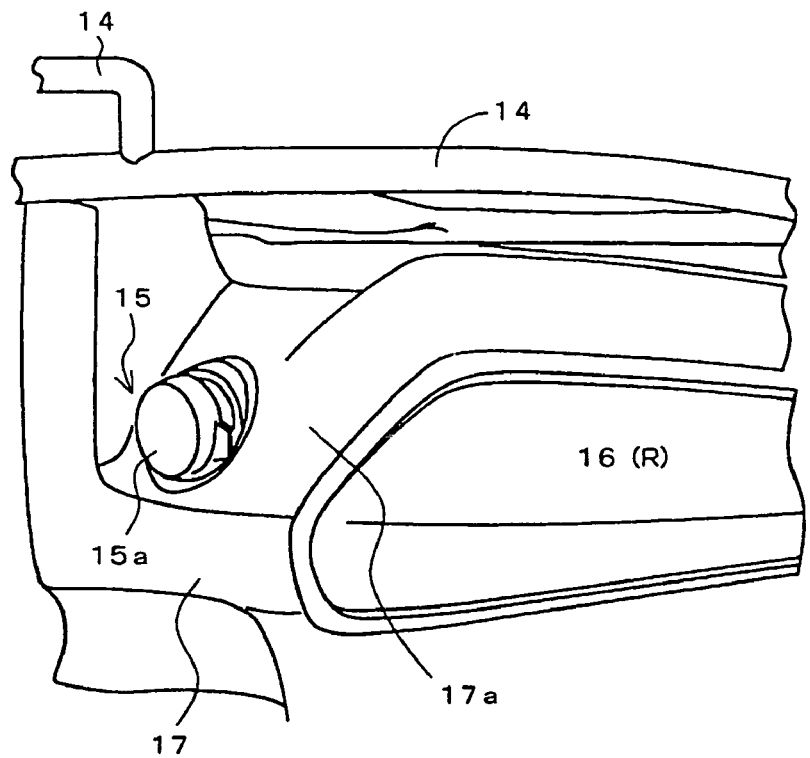
FIG. 4 is a drawing showing the shape of a rear cowl on which the accessory socket is arranged.

In the present embodiment, in order to arrange the accessory socket 15 at such position, as shown in FIG. 4, the rear cowl 17 is formed with a recess 17a and the accessory socket 15 is disposed in the recess 17a. As a consequence, even when the vehicle is stored in the upright position, the accessory socket 15 is not brought into contact with the ground, and thus the accessory socket 15 is prevented from being broken by coming into contact with the ground when stored in the upright position.

Figure 5:
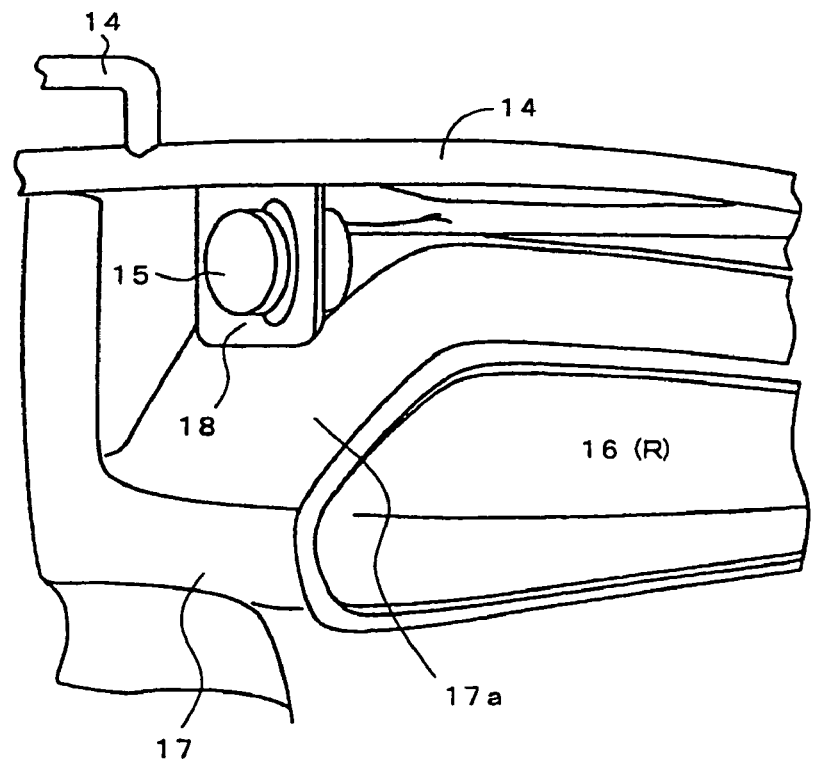
FIG. 5 is a drawing showing an example in which an accessory socket is mounted to a rear carrier.

The portion to mount the accessory socket 15 is not limited to the rear cowl 17, and it is also possible to suspend a stay 18 or a supporting member being resemble thereto from the rear carrier 14 and mounting the accessory socket 15 to the supporting member, as shown in FIG. 5. Alternatively, it may be mounted to the front cowl, the front fender, or the rear fender.

In the present embodiment, a protective cover 15a for preventing mud, sand, and water from entering into the accessory socket 15 is provided, and an opening of the accessory socket 15 is covered by the protective cover 15a.

According to the present embodiment, by providing the accessory socket on the vehicle body, a power can be supplied easily from the vehicle to the accessory device mounted on the vehicle body, or to the accessory device to be used in the vicinity of the vehicle, without using the extension cable.

While the invention has been described in particular embodiments, it is to be understood that the words which have been used are words of description rather than limitation and that changes within the purview of the appended claims may be made without departing from the true scope and spirit of the invention in its broader aspects.

We claim:

1. A four-wheeled all-terrain vehicle comprising:
   right and left front wheels;
   right and left rear wheels;
   a driver's seat;
   a fuel tank mounted forwardly of the driver's seat;
   an engine mounted below the fuel tank;
   right and left rear fenders over at least a portion of the rear wheels;
   a rear cowl extending from the right and left rear fenders, the rear cowl having a rearwardmost surface that is forward of rearwardmost points of the right and left rear wheels;
   right and left rear combination lamps mounted on the rear cowl;
   a rear carrier having a rear end, the rear carrier is mounted on a rear portion of the vehicle above the rear cowl and the rear end is positioned to the rear of the rearwardmost surface of the cowl, wherein the vehicle can be stood upright with the right and left wheels and the rear end of the rear carrier in contact with the ground and with the rear cowl not in contact with the ground; and
   an accessory socket for supplying power to an accessory device, the accessory socket is mounted on the cowl forwardly of the rear end of the rear carrier and downwardly of the rear carrier, and the accessory socket is positioned to the rear of the driver's seat, and the accessory socket is provided between the left and right rear combination lamps, and the socket is positioned closer to one of the lamps than to the other lamp, wherein when the vehicle is stood upright the accessory socket does not contact the ground.

2. A four-wheeled all-terrain vehicle according to claim 1, wherein the accessory socket is provided with a protective cover.

3. A four-wheeled all-terrain vehicle according to claim 1, wherein the accessory socket is positioned in close proximity to one of the lamps.

* * * * *